United States Patent [19]

Barth et al.

[11] Patent Number: 4,576,534
[45] Date of Patent: Mar. 18, 1986

[54] THREAD FORM FOR SOFT MATERIAL

[75] Inventors: Gerald D. Barth, South Elgin; David P. Wagner, Geneva, both of Ill.

[73] Assignee: Illinois Tool Works Inc., Chicago, Ill.

[21] Appl. No.: 520,108

[22] Filed: Aug. 4, 1983

[51] Int. Cl.⁴ .................................. F16B 33/02
[52] U.S. Cl. ................................................ 411/412
[58] Field of Search ............... 411/412, 411, 413, 414, 411/415, 423, 259, 263, 307, 308, 309, 310, 311

[56] References Cited

U.S. PATENT DOCUMENTS

| Re. 3,941 | 4/1870 | Pierce | 411/406 |
|---|---|---|---|
| 1,451,484 | 4/1923 | Woodward | 411/311 |
| 2,301,181 | 11/1942 | Ilsemann | 411/309 |
| 2,788,046 | 4/1957 | Rosan | 411/311 |
| 3,207,023 | 9/1965 | Knohl | 411/412 X |
| 3,426,820 | 2/1969 | Phipard | 411/310 |
| 3,653,241 | 4/1972 | Orlomoski | 72/88 |
| 4,273,175 | 6/1981 | Capuano | 411/310 X |

FOREIGN PATENT DOCUMENTS

| 2853976 | 6/1980 | Fed. Rep. of Germany | 411/387 |
|---|---|---|---|
| 876474 | 11/1942 | France | 411/411 |

Primary Examiner—Kenneth J. Dorner
Assistant Examiner—Adrian H. Whitcomb, Jr.
Attorney, Agent, or Firm—David I. Roche; Thomas W. Buckman

[57] ABSTRACT

A screw for soft material having an assymetrical thread form which includes an upper flank comprised of a plurality of continuous helical surfaces. The upper flank surfaces are configured such that a helical protrusion is formed on the upper flank which causes increased friction between the screw and the workpiece only after seating of the screw head has occurred.

13 Claims, 6 Drawing Figures

THREAD FORM FOR SOFT MATERIAL

BACKGROUND AND SUMMARY OF THE INVENTION

The present invention relates to screws for use in soft material such as plastic. The invention also has application in material such as cast aluminum and other soft metals.

Fastening to such material has been a problem particularly when a boss is formed in the workpiece to conserve material, to provide spacing, or to provide more material for engagement. Bosses tend to break as a result of radial stresses induced upon insertion of a screw. Frequently, when bosses are used, the boss location is the only suitable place for fastening. If the boss is damaged, no alternative exists but to discard an entire part.

Another problem associated with fastening to soft material is due to the fact that screws are often driven with mechanical drivers having settable torque limiting clutches. The use of such drivers makes it desirable to design screws with a large operating range (O.R). The O.R is the difference between the maximum amount of torque required to drive a screw and the minimum torque at which a screw will strip out. If a screw has a small O.R., variations (even within allowable tolerances) in hole size, screw size and finish, etc. will make proper setting of an automatic clutch difficult, because those variations will tend to make some screws undrivable and others strip out. Screws having a large O.R. make an effective setting of the clutch easier, because tolerance variations in the screw or workpiece will less often result in a screw falling outside the O.R. The result is that fewer screws are undrivable, fewer screws strip, and fewer parts need to be scrapped.

An object of the invention is to provide a screw having a thread which tends to increase strip torque without significant increases in radial stress.

Another object is to provide a screw thread form which increases strip torque without a proportionate increase in drive torque.

Another object is to provide a screw which has the above characteristics and which optimizes the use of blank material to allow for larger shank diameter for a given crest diameter.

These and other objects and advantages are achieved by providing a screw with a thread which has an upper flank with a compound surface which tends to increase the frictional engagement between the screw and the workpiece only after the head of the screw contacts the article being fastened. Tightening of the screw causes workpiece material to deform into frictional contact with the upper flank, and the upper flank is shaped to optimize friction while advantageously distributing radial stress.

The objects and advantages of the present invention will be better understood by reading the following specification in conjunction with the accompanying drawings.

DETAILED DESCRIPTION OF THE DRAWINGS

DETAILED DESCRIPTION OF THE INVENTION

Figure 3:
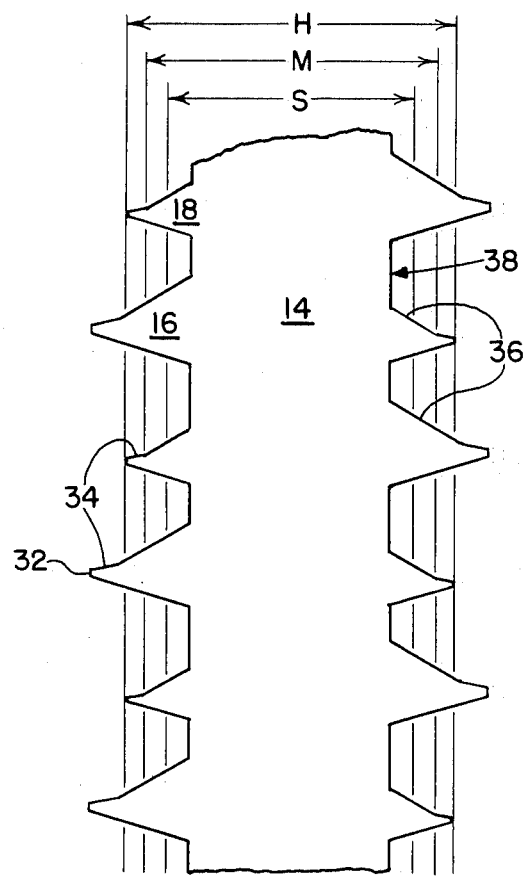
FIG. 3 is an enlarged semi-diagramatic view showing the screw in combination with various hole sizes.
Figure 1:
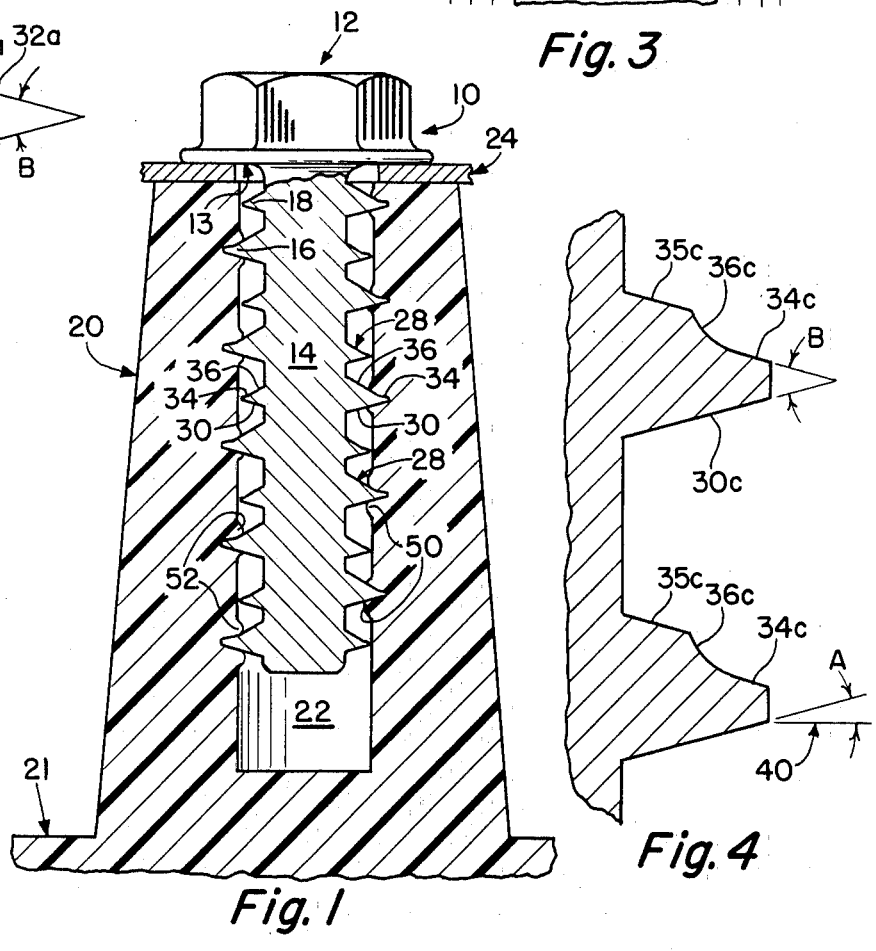
FIG. 1 is a sectional view of a screw embodying the present invention in an environment where it is particularly useful.
Figure 5:
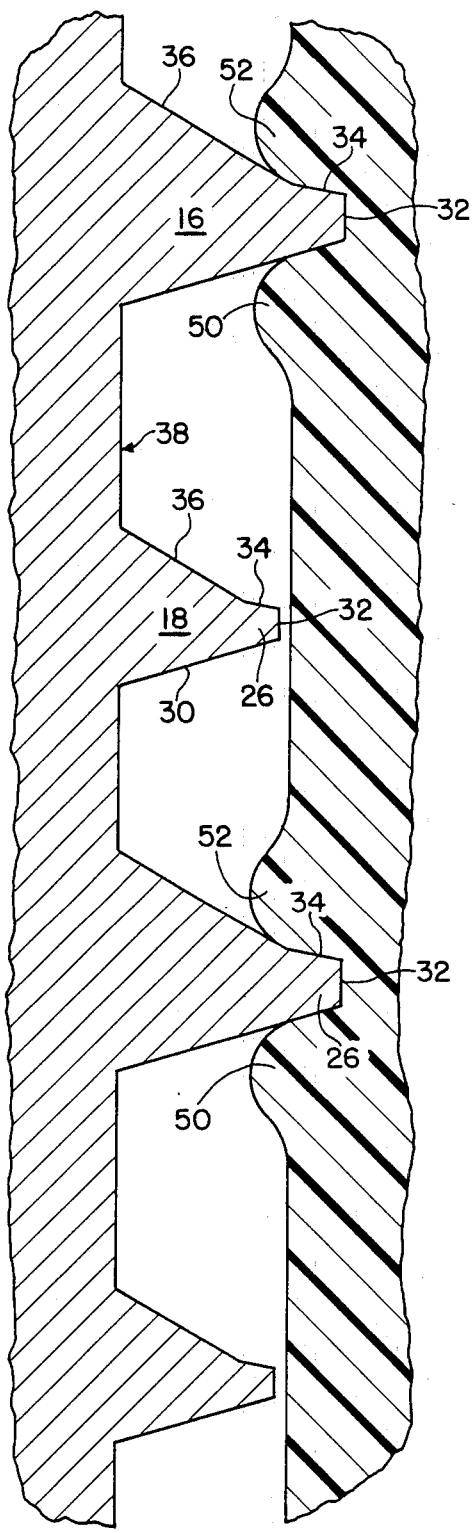
FIGS. 5 and 6 are enlarged sectional views of a screw of the present invention before and after tightening, respectively.
Figure 6:
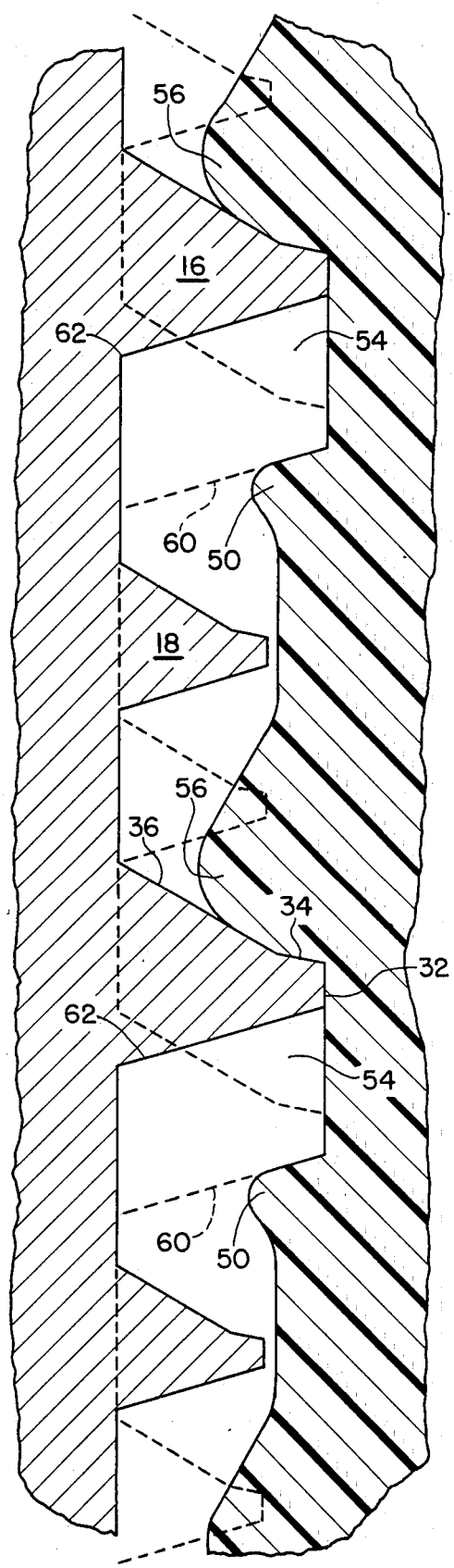

In FIG. 1, a screw 10 is shown inserted in a bore 22 formed in a boss 20 projecting from a workpiece 21. The screw 10 has a hexagonal head 12 with an undersurface 13. It should be noted that any of several other head configurations may be used, such as recessed, oval head, phillips, slotted, etc. The screw has a double lead thread form on an elongated shank 14 including a high thread 16 and a low thread 18. The screw 10 is shown clamping an article 24 to the upper surface of the boss 20. The high and low threads 16 and 18 have generally similar shapes with the high thread 16 being substantially larger than the low thread 18. Each thread is comprised of an upper flank 28 on the head side of the thread and a lower flank 30 on the side of the thread facing the entering end of the screw. The lower flank 30 is generally straight in cross-section while the upper flank 28 is compound and includes an inner surface 36 and an outer surface 34. The thread form shown in FIGS. 3, 5, and 6 is the same as that shown in FIG. 1.

Figure 2:
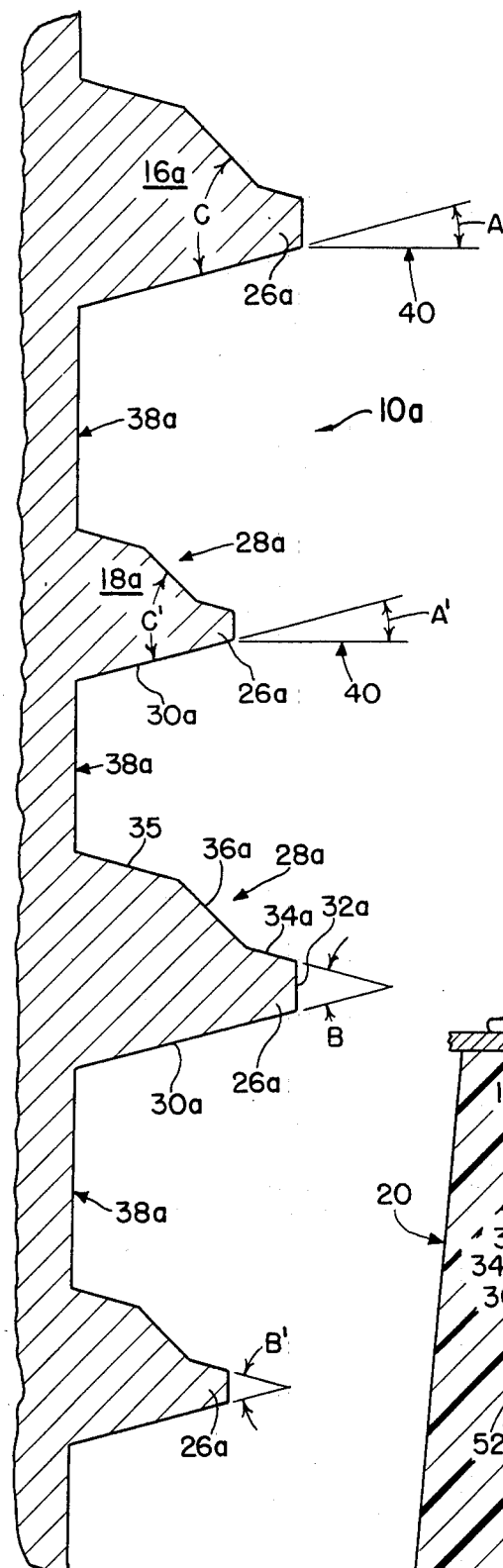
FIG. 2 is an enlarged sectional view of a portion of a screw having threads in accordance with an alternative embodiment of the present invention.

FIG. 2 is an alternative thread form in which the upper flank is like that of FIGS. 1, 3, 5, and 6 except that the inner surface is further compounded and includes a second inner surface 35. In FIG. 2, the lower flank 30a makes an angle A with a plane 40 perpendicular to the axis of the screw 10a, which angle A is approximately 15°. The angle B between the outer surface 34a and the lower flank is approximately 30°. The inner surface 36a makes an angle C of about 60° with the lower flank 30a. The second inner surface 35 is 30° with the lower flank 30a. The second inner surface 35 is generally parallel to the outer surface 34a.

The lengths of the surfaces are such that the screw works optimally in various materials. The outer surface 34 intersects the inner surface 36 at a distance approximately equal to 75% of the height of the thread. The height is defined as the radial distance between the crest surface 32 and the root surface 38. This is true with respect to all of the embodiments shown in the figures. The intersection of the inner and outer surfaces 36 and 34 at the above described distance is intended to facilitate insertion of the screw in harder, more brittle plastics and soft metals. The relatively shallow 30° included angle B at the tip 26 of the thread has been found to be successful in providing low drive torque and yet providing sufficient strength to attain adequate pull-out values, while also generating tolerable radial stresses.

Figure 4:
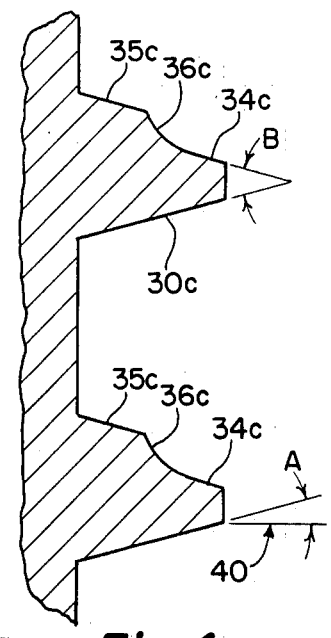
FIG. 4 is an enlarged sectional view of a second alternative embodiment of a screw thread according to the present invention.

FIG. 4 shows a third embodiment of the present invention. The upper flank of this embodiment includes outer and second inner surfaces 34c and 35c substantially similar to that of the embodiment of FIG. 2. However, the inner surface 36c is curved. Another distinction between the embodiment of FIG. 4 and the others is that it has only a single thread height. It should be noted however, that this and the other embodiments could include either single or double lead thread designs.

FIG. 3 shows, in diagramatic form, approximate hole sizes for materials of various hardnesses. The hole sizes are shown intersecting the threads at various locations. The designations H, M, and S stand for "hard", "medium", and "soft" respectively. Harder and more brittle materials should engage the high thread 16 at approximately the intersection between the outer surface 34 and the inner surface 36, and the harder brittle material should only abut the crest surface 32 of the low thread 18. Materials of intermediate softness and toughness should engage at approximately the intersection of the inner and outer surfaces of the low thread 18. Soft plastic material should engage substantial portions of both threads. Such materials can withstand large localized deformations without translating such deformations into large radial stresses. It should be noted that the above discussion is meant to be a general guideline. Thermoset plastic materials such as phenolics and glass filled polyesters generally require large holes to avoid breaking during driving. Thermoplastics such as ABS, and polyethylene can be formed with smaller holes.

FIGS. 5 and 6 show enlarged views of localized deformations of workpiece material upon the insertion of a screw in accordance with the present invention. FIG. 5 shows small deformations 52 and 50 adjacent the tip 26 of the high thread 16 as the screw is being threaded into a workpiece. As the head of the screw (not shown) comes into contact with the workpiece, further axial movement of the screw is prevented. FIG. 6 shows the augering or Archimedean effect upon the workpiece after an approximately 90° rotation (¼ turn) of the screw after the head contacts the workpiece. The dotted line 60 in FIG. 6 shows the initial position of the screw at the instant the head contacts the workpiece, while the solid profile 62 represents the final position of the screw after ¼ turn from the position represented by line 60. The rotation of the screw from initial position to a ¼ turn position creates an enlarged deformation 56 adjacent to the upper flank 28 of the high thread 16. Because the upper flank of the thread is enlarged, increased frictional resistance to rotation begins to take effect upon tightening of the screw. In softer workpieces, the low thread 18 will engage and deform the workpiece in a similar manner, and will form enlarged deformations (not shown) similar to deformations 56 formed by the high thread 16.

Creations of the deformations 56 in the workpiece not only have the effect of increasing frictional resistance; the increased deformation of the workpiece as a result of the helical protrusion on the upper flank has the effect of work hardening (strain hardening) areas of the workpiece adjacent to the upper flank. The effects of work hardening are most notable in thermoplastic materials where soft materials can become significantly stronger and harder as a result of plastic deformation. This increased strength and hardness contributes to the screw's ability to resist stripping and pull-out.

Each of the upper flank surfaces are generally smooth so that the screw can be easily inserted. By making the upper flank surfaces smooth and without surface interruptions a screw will be capable of improved performance in a variety of materials and hole sizes. However, it should be noted that in some situations, surface interruptions on the inner surfaces of the upper flank could be advantageous, either to prevent stripping or to prevent loosening of the screw.

By creating a compound surface and continuous helical protrusion only on the upper flank, more metal can be left in the blank to increase resistance to torsional failure. Therefore, for a given crest diameter, a screw of the present invention, having an assymetrical profile, will have a larger root diameter than a screw having a similar protruding upper as well as lower flank, if made from the same sized blank material.

While the invention has been described with reference to particular preferred embodiments, it is apparent that numerous alternatives, modifications and substitutions may be made without departing from the spirit and scope of the appended claims.

I claim:

1. A threaded fastener comprising a shank having an enlarged head at one end and an entering portion at the other end, at least one thead on said shank, said thread including an upper and a lower flank, said upper flank having a compound surface larger in area than that of said lower flank, said compound surface comprising a plurality of three smooth helical surfaces, two inner surfaces of said three helical surfaces forming an obtuse included angle and forming a continuous helical protrusion on said thread, an outer end of said three surfaces forming an acute angle with said lower flank, whereby said thread has an assymetrical transverse cross-section adapted to increase surface friction between said upper flank and workpiece material which is deformed upon tightening of said fastener after contact between said head and a workpiece.

2. A fastener according to claim 1 having a plurality of substantially similarly shaped threads.

3. A fastener according to claim 2 wherein a first one of said plurality of similarly shaped threads is substantially larger than a second of said plurality of similarly shaped threads.

4. A fastener according to claim 3 wherein said threads are spaced from each other by an average amount approximately equal to the average base width of said threads.

5. A fastener according to claim 1 wherein a second of said two inner surfaces and outer surface of said upper flank intersect at a distance from the base of said thread approximately equal to 75% of the height of said thread.

6. A fastener according to claim 1 wherein one of said inner surfaces is substantially parallel to said outer surface thereof and said two inner surfaces intersect at a distance from the base of said thread approximately equal to 45% of the height of said thread.

7. A fastener according to claim 5 wherein said outer surface makes approximately a 30° angle with said lower flank, and said second inner surface makes approximately a 60° angle with said lower flank.

8. A fastener according to claim 7 wherein said outer surface of said upper flank and said lower flank each make an angle of approximately 15° with a plane perpendicular to the axis of said fastener.

9. A fastener according to claim 2 wherein one of said threads is approximately two-thirds as high as the other of said threads.

10. A threaded fastener comprising a shank having an enlarged head at one end and a tip at the other end, a first and a second thread having substantially identical pitch, said first thread being approximately two-thirds as high as said second thread, one of said threads having an upper and a lower flank, said upper flank comprised of three helical surfaces and said lower flank comprised of a single helical surface, an outer surface of said three surfaces making approximately a 30° angle with said lower flank, an inner intermediate surface of said three surfaces making approximately a 60° angle with said lower flank, and a second inner surface intersecting said shank and generally parallel to said outer surface.

11. A fastener according to claim 10 wherein said outer and said inner intermediate surfaces of each of said first and second threads intersect at a distance from said shank approximately equal to 75% of the height of said threads, respectively.

12. A fastener according to claim 10 wherein said inner intermediate and said third surface of said first and second threads intersect at a distance from said shank approximately equal to 45% of the height of said threads respectively.

13. A threaded fastener for use in a workpiece of plastically deformable material comprising a shank having an enlarged head at one end and an entering portion at the other end, a thread having an upper flank and a lower flank, said upper flank comprising three smooth helical surfaces, an inner surface extending outwardly from a root of said thread, an outer surface extending inwardly from a crest of said thread, and an intermediate surface extending between said inner and said outer surface, said inner and outer surfaces making an acute angle with said lower flank, and said intermediate surface making an obtuse included angle with said inner surface, said inner and said intermediate surfaces intersecting to form a generally convex continuous protrusion on an inner portion of said upper flank whereby surface contact between said workpiece material and said upper flank is suddenly increased upon tightening of said fastener after contact between said head and said workpiece.

* * * * *